Oct. 31, 1961      A. HALPERT      3,006,476
AQUARIUM FILTER
Filed June 19, 1959
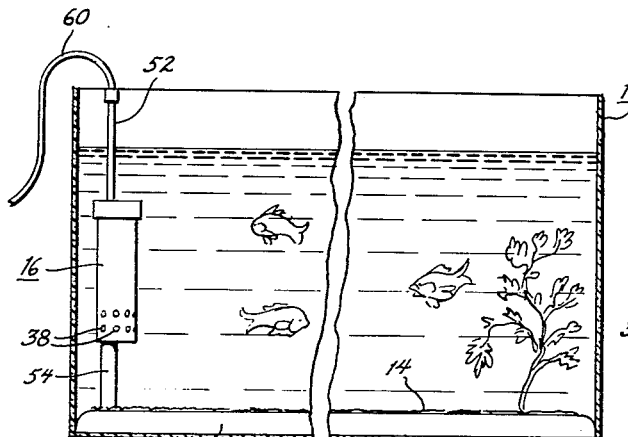
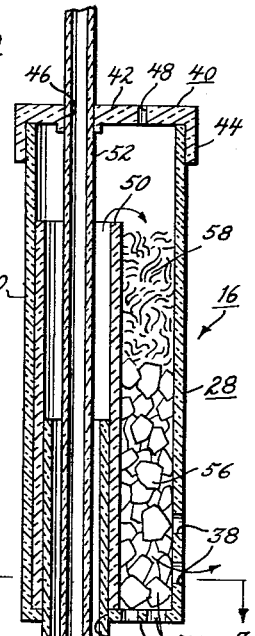
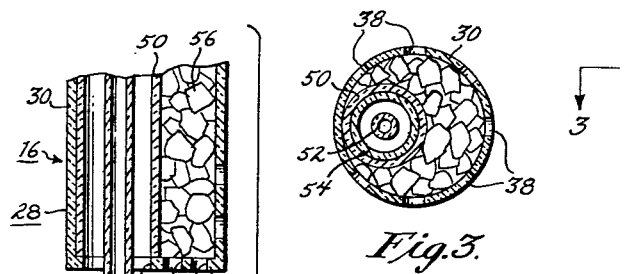
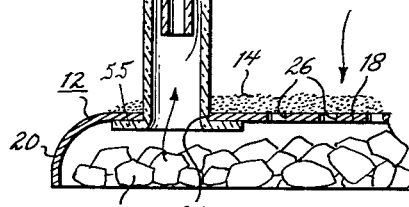
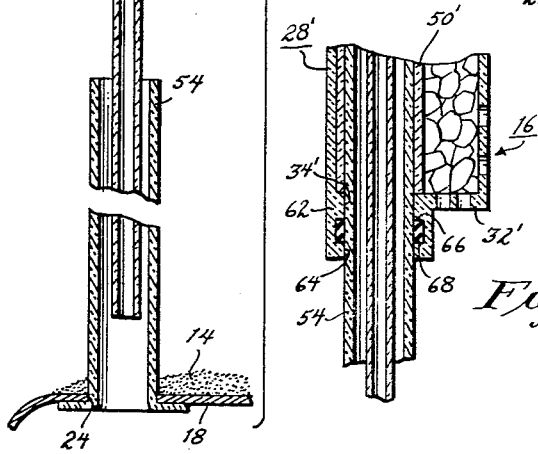
INVENTOR.
ABBY HALPERT
BY Arthur H. Seidel
ATTORNEY.

United States Patent Office 3,006,476
Patented Oct. 31, 1961

3,006,476
AQUARIUM FILTER
Abby Halpert, Brooklyn, N.Y., assignor to Halvin
Products Co., Brooklyn, N.Y., a partnership
Filed June 19, 1959, Ser. No. 822,984
3 Claims. (Cl. 210—169)

The present invention relates to an aquarium filter, and more particularly to a device for aerating and filtering the water in an aquarium.

The aquariums that are normally used for cultivating fish in the home are relatively small, and the water in the aquarium is practically stationary and is not replaced except at intervals of time. Since the fish in such an aquarium require air, it has been customary to bubble such air through the water of the aquarium. Also, the water of such an aquarium becomes contaminated with excretion from the fish, and other foreign matters which fall into the aquarium so that cleansing of the water is necessary. For cleaning the water of an aquarium, filters have been used which contain a filter medium, such as charcoal and/or glass wool, through which the water in the aquarium is circulated. One type of filter which is commonly used in home aquariums is a device which is disposed on the bottom of the aquarium, and is either entirely or partially covered with gravel. However, such an under gravel filter has the disadvantage that when the filter medium becomes entirely contaminated, it is necessary to completely tear down the aquarium in order to remove the filter and replace the filter medium. Thus, to replace the filter medium of such an under gravel filter it is necessary to completely remove all of the plants and gravel from the aquarium to remove the filter, which is a messy and time consuming operation.

It is object of the present invention to provide a novel aquarium filter.

It is another object of the present invention to provide a filter which is capable of aerating and filtering the water in an aquarium.

It is still another object of the present invention to provide an aquarium filter which can be easily removed from the aquarium to replace the filter medium in the filter.

It is a further object of the present invention to provide an aquarium filter which can be used as an auxiliary to an under gravel filter to extend the life of the filter medium in the under gravel filter.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a sectional view through an aquarium containing the filter of the present invention.

FIGURE 2 is a sectional view of the aquarium filter of the present invention.

FIGURE 3 is a sectional view taken along line 3—3 of FIGURE 2.

FIGURE 4 is an exploded sectional view of the bottom portion of the filter of the present invention illustrating the manner of removing the filter.

FIGURE 5 is a sectional view of the bottom portion of a modification of the filter of the present invention.

Referring initially to FIGURE 1, there is shown an aquarium which includes a tank 10, an under gravel filter 12 which is seated on the bottom of the tank 10, gravel 14 covering the under gravel filter 12, and the filter of the present invention which is generally designated as 16.

The under gravel filter 12 in general comprises a plate 18 having a downwardly extending rim 20. The plate 18 is of a size to extend across the bottom of the tank 10. The rim 20 spaces the plate 18 slightly from the bottom of the tank 10 so that a filter medium 22, such as charcoal, can be placed between the plate 18 and the bottom of the tank 10. The plate 18 has a relatively large inlet hole 24 therethrough adjacent one end of the plate 18, and a plurality of small holes 26 therethrough through which water and air can pass.

Referring to FIGURE 2, the filter 16 of the present invention comprises a housing 28 having an elongated cylindrical outer wall 30, and a bottom wall 32. Bottom wall 32 of housing 28 has a relatively large hole 34 therethrough adjacent the outer wall 30, and a plurality of small holes 36 therethrough spaced around the large hole 34. Outer wall 30 of housing 28 has a plurality of small holes 38 therethrough spaced around the circumference of the outer wall 30 adjacent the bottom wall 32. A cap 40 fits over the top end of the housing 28. Cap 40 comprises a cover portion 42 which extends across the top end of the outer wall 30 of housing 28, and an annular rim 44 which fits tightly around the outer wall 30. The cover portion 42 of cap 40 has an inlet hole 46 which is in alignment with the large hole 34 in the bottom wall 32 of housing 28, and a small vent hole 48 therethrough. The housing 28 and cap 40 are preferably made of a transparent material, such as a plastic.

A divider tube 50 is within the housing 28. The bottom end of the divider tube 50 is secured to the inner surface of the bottom wall 32 of housing 28 around the large hole 34 in the bottom wall 32. The inner diameter of the divider tube 50 is substantially equal to the diameter of the hole 34. Divider tube 50 extends upwardly through the housing 28 to a point slightly below the top end of the housing 28. An elongated air feed tube 52 extends longitudinally through the housing 28, and projects beyond both ends of the housing 28. Air feed tube 52 extends through the hole 46 in the cover portion 42 of cap 40, through the divider tube 50, and through the hole 34 in the bottom wall 32 of housing 28. The outer diameter of air feed tube 52 is substantially smaller than the inner diameter of divider tube 50 and the hole 34 in the bottom wall 32 of housing 28. The diameter of the hole 46 in the cover portion 42 of cap 40 is substantially equal to the outer diameter of the air feed tube 52 so that the air feed tube 52 has a friction fit in the hole 46. The housing 28 is supported on an output tube 54. Output tube 54 is supported at its bottom end in the hole 24 in the plate 18 of the under gravel filter 12 by a friction fit. Output tube 54 has an annular, radially extending flange 55 at its bottom end which engages the inner surface of the plate 18 to prevent the output tube 54 from being pulled from the plate 18. The upper end of the output tube 54 extends through the hole 34 in the bottom wall 32 of housing 28 into the divider tube 50, with the air feed tube 52 extending into the output tube 54. The outer diameter of the output tube 54 is substantially equal to the diameter of the hole 34 and the inner diameter of the divider tube 50 so that the output tube 54 has a friction fit in the hole 34 and the divider tube 50. The outer diameter of the air feed tube 52 is smaller than the inner diameter of the output tube 54 so as to provide a passageway between the air feed tube 52 and the output tube 54. The outer surface of air feed tube 52 is cemented to the inner surface of output tube 54, so as to anchor the air feed tube 52 relative to the output tube 54.

In the use of the filter 16 of the present invention, a portion of the housing 28 is filled with charcoal 56, and the remaining portion of the housing 28 is filled up to the top end of the divider tube 50 with glass wool 58. Although the glass wool 58 is shown to be above the charcoal 56, the glass wool 58 can be in the bottom of the housing 28 beneath the charcoal 56. The housing 28 is mounted on the output tube 54 so that the housing 28 is completely immersed in the water in the tank 10, as shown in FIG- URE 1. On the flow of air downwardly through the air feed tube 52 from the flexible tube 60 which may be joined to an air pump, water from the aquarium passes through the gravel 14 and then through the holes 26 in the under gravel filter plate 18, as shown by the arrow at the right of FIGURE 2. The water then flows up output tube 54 (as shown by the arrows in FIGURE 2), and then passes from the output tube 54 into the filter 16. Air, which goes from air feed tube 52 up output tube 54, is entrapped within the top of filter 16 and escapes through vent hole 48, aerating the water in the aquarium.

The water passes down through glass wool 58 and charcoal 56, which remove both waste gases and solids therefrom, and then reenters the aquarium by passing through holes 36 and 38 in housing 28.

The under gravel filter 12 further filters the water, and the gravel bed serves to anaerobically destroy solid wastes.

When the charcoal 56 and/or the glass wool 58 in the filter 16 of the present invention becomes contaminated, it is only necessary to lift the housing 28 of the filter 16 from the output tube 54, and remove the housing 28 from the tank 10. The cap 40 and air feed tube 52 are then removed from the housing 28 so that the charcoal 56 and the glass wool 58 can be removed from the housing 28 and replaced with fresh charcoal and glass wool. With fresh charcoal and glass wool in the housing 28, the cap 40 and air feed tube 52 are replaced on the housing 28, and the housing 28 is emersed in the water in the tank 10, and remounted on the output tube 54. Thus, the filter material in the filter 16 of the present invention can be easily and quickly replaced without disturbing the arrangement in the aquarium tank 10.

Referring to FIGURE 5, the modification of the filter of the present invention is generally designated as 16'.

Filter 16' comprises a housing 28' similar to the housing 28 of the filter 16 shown in FIGURE 2. However the housing 28' has a cylindrical boss 62 extending downwardly from the outer surface of the bottom wall 32' beneath the hole 34' in the bottom wall 32'. Boss 62 has a hole 64 therethrough in alignment with the hole 34' in the bottom wall 32'. An annular groove 66 is provided in the wall of the hole 64 in the boss 62, and a rubber gasket 68 is within the annular groove 66. The output tube 54 extends through the hole 64 in the boss 62, through the hole 34' in the botom wall 32', and into the divider tube 50'. The gasket 68 frictionally engages the outer surface of the output tube 54 to seal the hole 64 and to hold the housing 28' in position on the output tube 54. Filter 16' operates in the same manner as the filter 16 shown in FIGURE 2 as previously described.

It is possible to utilize air feed tubes and output tubes which are not disposed one within the other with many types of under gravel filters. Thus, a separate air feed tube and a separate output tube may be provided at a spaced distance from each other on an under gravel filter. In such constitution, the filter 16 of the present invention may be mounted on the output tube.

The present invention may be embodied in other specific forms without departing from the spirit or essential attributes thereof and, accordingly, reference should be made to the appended claims, rather than to the foregoing specification as indicating the scope of the invention.

I claim:

1. An aquarium filter comprising a housing having an outer wall and a bottom wall, a divider tube fixedly secured to said bottom wall with the inner peripheral surface of said divider tube being substantially coextensive with an aperture in said bottom wall, an output tube extending through said aperture into said divider tube, said output tube and divider tube having a friction fit therebetween, the upper end of said output tube being lower than the upper end of said divider tube, the upper end of said divider tube being spaced below a top on said housing, a vent in said top of said housing, filter material disposed within said housing between the outer peripheral surface of said divider tube and the inner peripheral surface of said outer wall on said housing, an air feed tube having an outer diameter smaller than the inner diameter of said output tube, said air feed tube extending through the top of said housing with one end of said air feed tube being disposed within the output tube below the bottom wall of said housing, and a plurality of holes in the bottom portion of said housing.

2. A filter in accordance with claim 1 including a gravel filter plate, said output tube extending through an aperture in said plate and having a force fit therebetween, a flange on the lowermost end of said output tube, said flange being juxtaposed against said plate, air holes in said plate, said air holes lying in a portion of said plate which is in a plane disposed intermediate said flange and the bottom wall of said housing.

3. An aquarium filter in accordance with claim 1 including a gravel filter plate, a rim means on said plate for spacing said plate from a supporting surface, air holes in said plate, an aperture in said plate, and one end of said output tube extending into said aperture and being mechanically coupled to said plate.

References Cited in the file of this patent

UNITED STATES PATENTS

| | | |
|---|---|---|
| 1,574,783 | Beth | Mar. 2, 1926 |
| 2,137,397 | Haldeman | Nov. 22, 1938 |
| 2,515,538 | Wall | July 18, 1950 |
| 2,665,250 | Willinger et al. | Jan. 5, 1954 |
| 2,674,574 | Pettas | Apr. 6, 1954 |
| 2,748,075 | Hovlid | May 29, 1956 |
| 2,770,366 | Puzarowski | Nov. 13, 1956 |
| 2,822,925 | Lambertson | Feb. 11, 1958 |
| 2,877,898 | Lacey | Mar. 17, 1959 |
| 2,935,199 | Willinger | May 3, 1960 |

FOREIGN PATENTS

| | | |
|---|---|---|
| 663,562 | Great Britain | Dec. 27, 1951 |